United States Patent [19]

Wagner et al.

[11] Patent Number: 4,664,923
[45] Date of Patent: May 12, 1987

[54] METHOD OF INFRARED TUNNEL OVEN COOKING OF FOOD PRODUCTS

[75] Inventors: Dennis Wagner; Harold D. Wells, both of St. Louis County, Mo.

[73] Assignee: Pet Incorporated, St. Louis, Mo.

[21] Appl. No.: 778,350

[22] Filed: Oct. 24, 1985

Related U.S. Application Data

[62] Division of Ser. No. 611,108, May 17, 1984, Pat. No. 4,554,437.

[51] Int. Cl.⁴ .............................................. A23L 1/01
[52] U.S. Cl. ..................................... 426/233; 426/523
[58] Field of Search .............. 426/523, 233; 99/386, 99/401, 443 C; 219/388, 354, 411

[56] References Cited

U.S. PATENT DOCUMENTS

| 4,245,613 | 1/1981 | Wells et al. | 219/388 |
| 4,366,177 | 12/1982 | Wells et al. | 426/523 |

Primary Examiner—George Yeung
Attorney, Agent, or Firm—Kalish & Gilster

[57] ABSTRACT

An infrared tunnel oven includes one or more oven tiers each having a horizontal cooking tunnel with entrance and exit at opposite ends, the tier(s) being supported by a base. Each tunnel is divided along its length into multiple heating zones. The roof and hearth surfaces of each tunnel are heated by electrical heating panels for direct IR emission from the roof and hearth for direct absorption by food products conveyed through the tunnel by a continuous speed-controllable conveyor. Microprocessor-controlled circuitry monitors, by a thermocouple arrangment, the temperature of the roof and hearth in each zone, controlling the electric heating panels to maintain preselected roof and hearth temperatures in each such zone. The microprocessor also controls the conveyor speed for conveying of products along the length of the tunnel within a preselected cooking time. User selection of temperatures in the different zones and cooking time, as well as other functions, is provided by keypad entry. Temperatures and cooking times and other information are displayed to the user. Lateral zoning in addition to longitudinal zone is provided by other embodiments. The oven provides a method of profiled cooking of food products.

3 Claims, 7 Drawing Figures

METHOD OF INFRARED TUNNEL OVEN COOKING OF FOOD PRODUCTS

This is a divisional application of Ser. No. 611,108 filed May 17, 1984 now U.S. Pat. No. 4,554,437.

BACKGROUND AND SUMMARY OF THE INVENTION

The invention relates to cooking or heating apparatus and, more particularly, to an improved tunnel oven and method for heating food products and the like by conveying them through the tunnel within a preselected time.

The invention is concerned specifically with tunnel ovens of the type wherein such food products are cooked by the absorption of infrared radiant energy which is emitted directly from the very walls, such as the roof and floor of the tunnel.

Is has previously been known to utilize infrared radiation for heating of food and other products by providing heating of the tunnel surfaces by means of infrared emitters such as of the type disclosed in co-assigned U.S. Pat. No. 3,809,859 of Harold D. Wells, entitled "Infrared Emitter". Ovens of the type utilizing such emitters of tunnel character is disclosed in co-assigned U.S. Pat. Nos. 4,008,996 of Harold D. Wells, entitled "Multiple Tier Oven", and 4,245,613 entitled "Tunnel Oven".

Ovens of the type using infrared emitter panels as described above do not heat articles by heated air, whether confined, forced or otherwise, except incidentally, nor do they utilize red-hot glowing wire or ribbon elements or quartz units. Rather, the infrared radiation utilized is typically of a lower temperature than such elements, inasmuch as the surfaces of the tunnel itself, whether the hearth or roof, provide large "black body" sources of infrared radiation for absorption by the food products. Such infrared tunnel oven provides cooked food products which have increased moisture retention than to reduce shrinkage, thereby providing a food product which is of attractive appearance and is a delectation for the customer.

When tunnel ovens of the present character are utilized for fast food service, wherein partially prepared or frozen foods of a wide variety must be heated for prompt serving, the tunnel oven must be capable of dealing with a wide variety of initial product temperatures, theremal absorption characteristics, thermal mass, ultimate serving temperature, requirements for browning or other finishing of the product, as well as other characteristics and parameters peculiar to the type of product to be heated. It will be recognized, for example, that heating and serving of fish fillets requires a processing time and heating profile which are different from those required for preparation of a thick cut of beef, etc. The problem is rendered difficult not only by the wide heating and temperature requirements of the food products to be cooked, but also by different requirements in cooking time, which will depend upon the rate of speed at which products are conveyed through the tunnel oven by a conveyor. Therefore, cooking of a wide variety of food products in such a tunnel oven requires consideration of a time-versus-temperature relationship which is unique to the food product being cooked.

Heretofore, conveyorized tunnel oven cooking equipment typically has utilized a single zone of heating in which a single temperature is maintained throughout the entire cooking process. This requires a longer time to bring food up to its ultimate cooking temperatures and in many cases compromises quality. Although it has been proposed to provide different zones longitudinally within conveyorized cooking equipment, such arrangements have not been utilized in a "black body" type of tunnel oven of the present character wherein the internal surfaces of the oven themselves act as the sources of infrared radiant energy. Nor have such multiply-zoned cooking arrangements addressed the problem of coordinating the cooking time, as brought about by controlling the speed of the conveyor, in a precisely coordinated relationship with the temperatures in the various zones in order to bring about a desired cooking profile for a specific food product.

It is an object of the present invention to provide an infrared tunnel oven for flameless, electric cooking of food products by the direct omission of infrared radiant energy from surfaces of the cooking tunnel wherein there are provided a plurality of heating zones, in each of which the infrared source temperatures can be independently maintained electronically by an electronic control circuit which, at the same time, also precisely controls the speed of a conveyor extending through the tunnel to provide conveying of food products along the length of the tunnel within a predetermined cooking time.

It is a further object of the present invention to provide a tunnel oven of the character stated which utilizes microprocessor control not only of the temperature in each of plural zones but also the speed of a conveyor extending through the tunnel oven for causing the food products to be conveyed through the length of the tunnel within a preselected cooking time.

It is a further object of the present invention to provide a tunnel oven of the type stated which allows user selection of different top and bottom temperatures within each of the plural cooking zones; which provides a continual read-out of all temperatures within the different zones; which includes provision for causing automated operation of functions including automatically turning off and on at particular times and dates which allows automatic self-cleaning to be initiated; which provides a stand-by mode in which electrical energization of heating elements is reduced for purposes of economy during slack periods.

It is another object of the present invention to provide a tunnel oven of the character stated which allows for the use of a cooking profile of food products within the tunnel oven for bringing about a major reduction in the cooking time of various food products so as to improve productivity, reduce energy costs, minimize cooking mistakes and food losses, and reduce floor space heretofore required for equipment.

It is also an object of the present invention to provide such a tunnel oven which saves labor and increases productivity; which reduces the need for highly skilled kitchen and maintenance personnel; which cuts employee training costs; and which reduces ventilation and air-conditioning costs.

A further object of the present invention to provide a tunnel oven of the type stated which has suitability for widespread usage for all sorts of institutional, industrial and commercial purposes; and which is highly reliable and long lasting in such use.

An object of the present invention is also to provide a tunnel oven of the character stated which can be configured in multiple tiers, stacked one above the other in compact disposition, wherein each such tier provides its own multiply-zoned tunnel wherein the cooking time, temperatures, and other aspects of operation of each such tier are independently controlled.

A still further object of the invention is to provide a method of infrared cooking of food products by use of a tunnel oven such as will achieve advantageous profiled cooking of the products in a reduced time and yet such as will produce a more suitable, delicious food product.

Briefly, an infrared tunnel oven for flameless, electric cooking of food products by infrared radiated energy includes at least one tunnel oven tier defining a cooking tunnel having an entrance and exit at opposite ends. The oven includes a base for supporting the tier (or tiers) for horizontal disposition of the tunnel in each such tier. The tunnel is divided along its length into at least two heating zones. The tunnel includes a roof as well as a hearth defining a floor over which a conveyor belt is driven electrically to convey food products through the tunnel. Independent electrical heating panels are utilized for separately heating the roof surfaces as well as the hearth within each zone to preselected top and bottom temperatures, respectively, for direct emission from the roof and hearth of infrared radiant energy into the tunnel for absorption directly by the food products as they are conveyed through it. The motor-driven conveyor is of continuous belt construction, being speed-controllable. A control circuitry for each tier includes microprocessor-controlled circuitry including provision for user preselection of top and bottom temperatures in each zone, as well as preselection of the cooking time, i.e., the time during which food products will be conveyed through the length of the tunnel. Such circuitry measures the top and the bottom temperatures in each zone, under microprocessor control, bringing about automatically the control of the electric heating panels to maintain substantially the preselected top and bottom temperatures in each zone. Also, the same microprocessor circuitry controls the speed of the conveyor to cause the food products to be conveyed through the length of the tunnel within the preselected cooking time. Accordingly, according to such apparatus and its novel method of use, the food products may be rapidly, accurately and uniformly cooked by being differentially heated in the different zones, to produce profiled cooking while they are conveyed through the zones in a precisely time-controlled manner.

Other objects and features will be in part apparent and in part pointed out hereinbelow.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
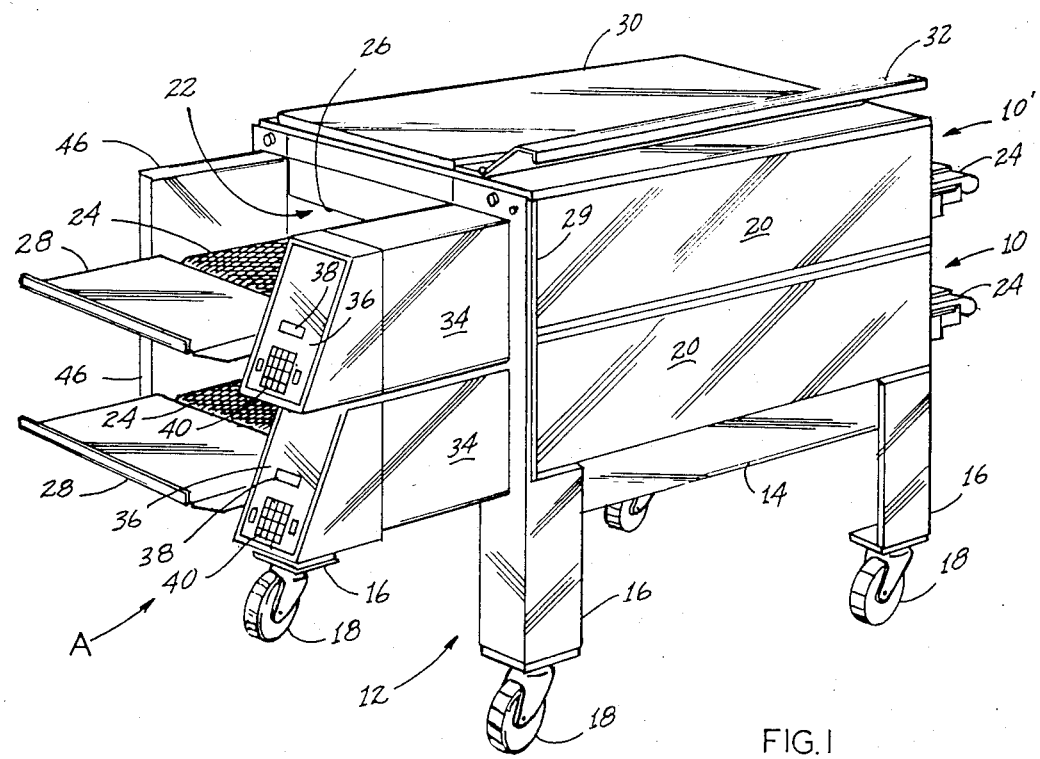
FIG. 1 is a perspective view of a multiple tier tunnel oven constructed in accordance with and embodying the present invention for profiled cooking of food products.

Referring now by reference characters to the drawings, there is designated at A one of various possible embodiments of a tunnel oven of the present invention for flameless, electric cooking of food products and the like by the emission of infrared radiant energy. A pair of oven tiers, generally designated 10, 10' are positioned one atop the other, being both supported by a base generally referred to as 12 having longitudinal support members as at 14 bridging legs 16. At the lower end of the legs are rollers 18 for readily allowing movement of oven A within desired premises, e.g., those of a commercial user engaged in fast food or industrial food service wherein partially prepared or frozen foods, such as pizza, casseroles, meat dishes, seafood and any of a myriad variety of foods are quickly heated for prompt serving upon the premises. Although thus manifestly directed to commercial users in restaurants and industrial food service, oven A has application for other industrial and commercial usage, as well as domestic use if scaled down appropriately and in single tier configuration.

Each of iters 10, 10' includes a central oven portion 20 wherein there is included a horizontal tunnel-form cooking chamber, as shown representatively at 22 within upper tier 10'. An endless conveyor 24 as of mesh screened character extends through the tunnel for conveying of products longitudinally therethrough to convey the products from an entrance at the right end of each tier as shown in FIG. 1 to an exit, as at 26, and for then depositing the cooked food products upon a delivery shelf 28 associated with each such tier. Structure, as at 29, of suitable nature, interconnects each such central portion 20 with base 12, and such structure may include an upper surface or cover 30 separate from the oven tier central portion 20 for enclosing wiring and providing a suitable finished surface. Such cover or top 30 may include as shown at one side a hinged access door 32 for permitting access to internal wiring of the oven, as for connection of AC power from power line mains, as for example, 440 volt three-phase service.

Figure 5:
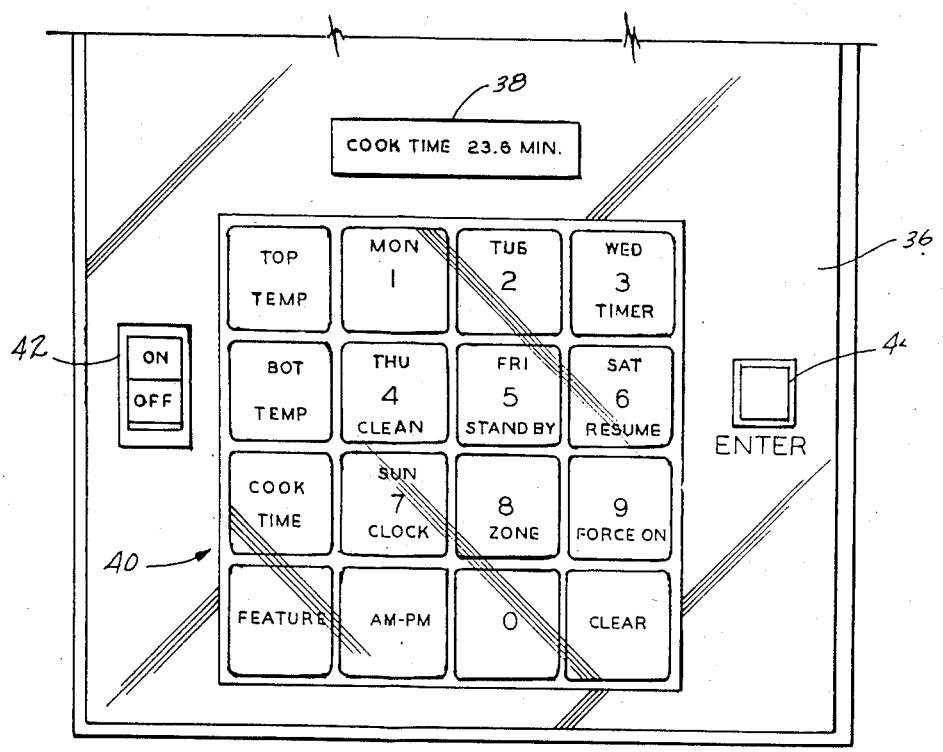
FIG. 5 is a plan view of a control panel of the new oven.

Located adjacent the serving shelf 28 of each such tier is a respective longitudinal projection 34 in which may be located control circuitry for the respective oven tier. Such circuitry is described later. Each such extension 34 includes at its outer extremity a sloped control panel 35 including an alphanumeric display 38 for providing read-out of temperatures, operating conditions, and other parameters associated with operation. Panel 36 includes also a pushbutton keyboard 40 by which the user may set, independently for each tier desired temperatures, cooking time, and other operating parameters, and other desired modes and conditions of operation, all of which will be provided and supervised automatically by microprocessor-controlled circuitry of the the invention. Referring temporarily to FIG. 5, it can be noted that the pushbutton pad a keyboard 40 includes buttons not only with numerals but also appropriate legends. An on-off switch 42 is also provided for each tier. A separate pushbutton 44 permits the user to enter a desired operating condition, setting or the like, after selecting same by keyboard 40.

Although only two such tiers 10, 10' are shown, a tunnel oven of the present character may as noted include but a single tier supported by base 12. Or the new oven may instead have three or four tiers, or so-called decks, etc., each of which has its own separate control circuitry and control panel 36 for independent control of all functions provided by each such tier. Each tier includes its own separate conveyor drive motor, or motors, which are housed in a rectangular extension 46 opposite the respective control circuitry extension 34 in the respective enclosure extension 46 is located the reduction gearing and other conventional drive components for the conveyor.

An oven of the present character is wholly electronic, utilizing heating elements of an electrically-energized nature to which the electrical power is controlled by circuits housed in the respective enclosure 34 of each tier.

Figure 2:
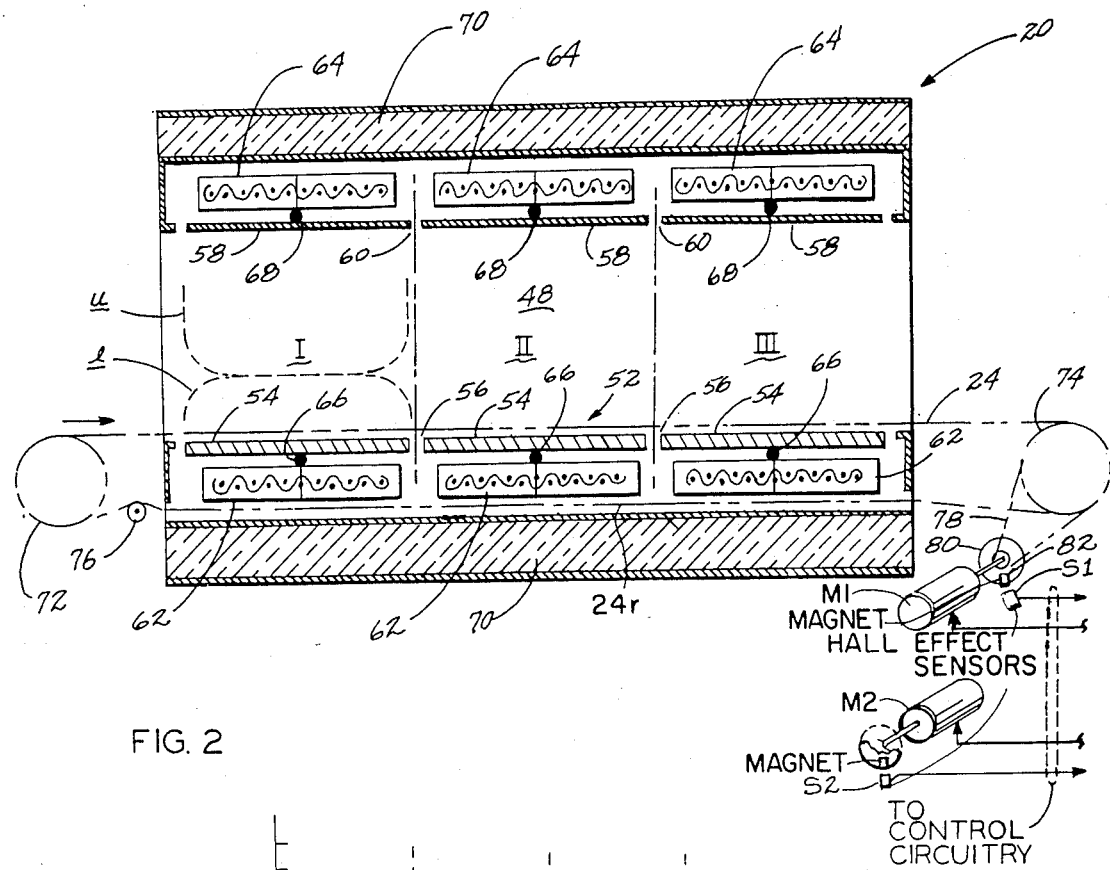
FIG. 2 is a simplified, diagramatic longitudinal cross section of the oven of FIG. 1.
Figure 3:
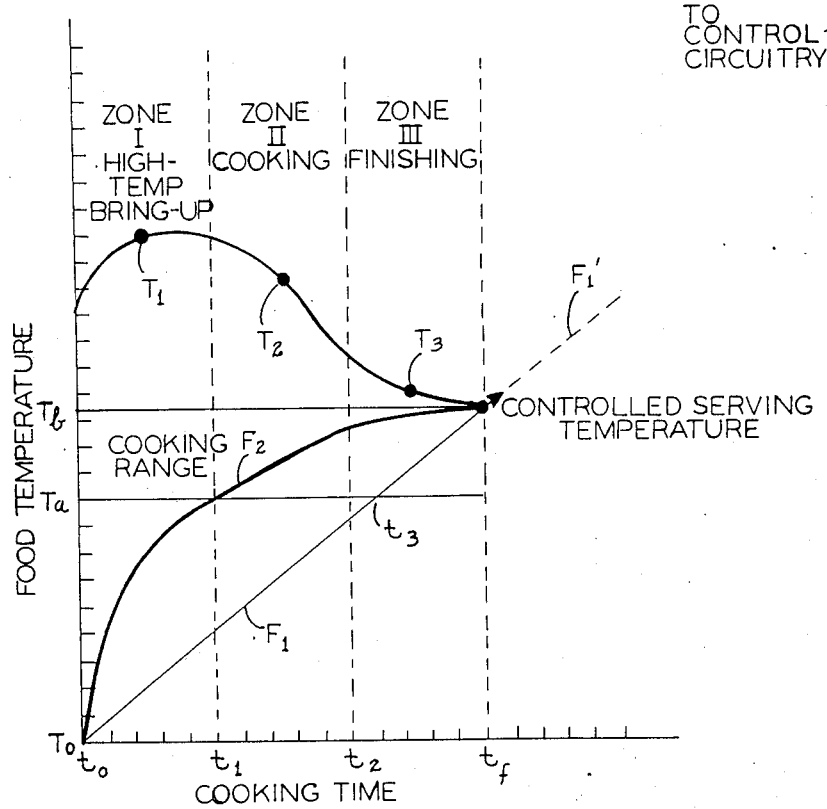
FIG. 3 is a plot of temperature and food temperatures within zones of such tunnel oven, as a function of cooking time.

Referring now to FIG. 2, a center section 20 of one of the oven tiers is shown in simplified, diagramatic form. Section 20 includes a horizontally exposed cooking tunnel 48, which may be most preferrably of rectangular cross section including a roof 50 and a floor generally designated 52 in the form of separate hearth panels or plate 54 which are joined end to end iwth but slight gaps 56 exaggerated in the drawing for purposes of illustration. Panels or plates together form a continuous longitudinal hearth or floor surface extending along the entire lengths of the tunnel 48. Said hearth plates 54 are most preferably relatively thick steel in order to provide a thermal mass characteristically associated with such a hearth as utilized in the present type of tunnel oven wherein the internal surfaces, i.e., the hearth or floor 52 and roof 50 themselves are heated to predetermined temperatures for direct emission of infrared radiant energy for absorption of food products.

Roof 50 is also defined by individual panels or plates 58 but of much less thickness than plates 54, being similarly joined end to end with slight gaps as at 60, which are greatly exaggerated in the drawing for purposes of illustration, but with roof 50 seemingly continuous. Because of the separate nature of plates 54, 58, both hearth and roof are thus each divided into individual sections which may be maintained at different temperatures, and with the small gaps or discontinuities 56, 60 providing substantial thermal isolation as between the different sections whereby the different temperatures of the same are more readily maintained.

Located beneath floor 52 are infrared emitters, herein termed IR heating units designated at 62 which are of panel-like configuration and lie closely beneath and proximate hearth plates 54. Although there is shown only one such IR heating unit 62 for each such plate 54, there may instead by a pair of such IR heaters for each such plate, as determined only by the desired ultimate length of the tunnel and by manufacturing considerations which may dictate preferred dimensions of each such unit 62. Similarly, IR units 64 are provided for each of roof panels or plates 58, being parallel to and closely proximate same. Again, for purposes of simplifying illustration, only one such unit 64 is shown for each plate 58. IR emitters utilized may be formed of the methodology and construction described and shown in co-assigned Wells U.S. Pat. No. 3,809,859.

Shown at 66, 68 are thermocouples which are illustrated as touching each of the respective hearth and roof plates 54, 58 to represent a condition of intimate thermal contact of each thermocouple with its respective plate and with its associated IR heating unit 62, 64 whereby the respective thermistor will be heated to precisely the same temperature as its associated respective hearth or roof panel. Said thermocouples 66, 68 may most preferably be part of a probe temperature sensing arrangement, as disclosed in co-assigned Wells et al U.S. Pat. No. 4,245,613 which illustrates also the preferred arrangement for obtaining intimate thermal relationship between the probe and respective roof or hearth heating surface.

Conveyor return reach 24r passes under heaters 62 for being kept hot.

Oven unit or portion 20 is also provided with thermal insulation 70, such as of layers of glass fiber for insulating the outer surfaces of unit 20 from the high temperatures developed internally by IR heating units 62, 64.

In the arrangement thus illustrated, there are provided three heating zones I, II, III along the length of the oven. In the different zones there may be different temperatures, allowing food products which are conveyed through the tunnel by conveyor 24 to be exposed the different temperatures in sequence as they pass successively through zones I, II, and III. However, since the hearth and roof panels or plates 54, 58 are separately heated, there is further developed if desired a vertical division of the zones into upper and lower portions. Thus, food products passing through any zone are exposed not only to the heating of the respective hearth plate 54 (over which conveyor 24 passes with only very small clearance so that the food product is essentially carried directly upon the hearth) but also to the infrared radiation directed toward the food product from respective roof plate 58, which may be at a markedly different temperature to provide, for example, sufficiently increased top surface temperatures as will be desirably for browning of food products. Accordingly, both longitudinal and vertical zoning is utilized to provide six zones, in each of which a different temperature may be established and maintained. While it is a matter of arbitrariness to show definitively the demarcation between the upper and lower regions within each such longitudinal zone, and particularly since heating is substantially through only radiation from the hearth and roof surfaces, and accordingly not by heated forced or convective air, there has shown within longitudinal zone I been merely for purposes of graphic illustration an upper vertical zone u and lower vertical zone portion 1. In other words, a food product upon conveyor 24 will be exposed on its top surface to the temperature associated with plate 58 in the respective zone while its bottom surface will be exposed to the temperature associated with the hearth plate 54 in such zone.

Conveyor 24 is as noted of continuous chain-belt configuration, being passed around opposite end rollers 72, 74. An idler roller 76 provides tensioning of the belt, which may be of steel or stainless steel and of a link or mesh character. Roller 74 is a drive roller, being driven through a belt 78 by a DC motor M1. The motor is of controllable speed type, being driven by digital circuitry of the invention at a precisely controlled speed for causing conveyor 24 to travel at such a precisely controlled speed that the food products are conveyed through tunnel 48 within a correspondingly precise time as preselected by the user. Control of the speed of motor M1 thereby provides also for precise control over the length of time during which such a food product will traverse the length of any one of zones I, II, and III. For speed control purposes, the motor shaft includes a wheel 80 carrying a small permanent magnet 82 by means of which a sensor S1 operates sense each rotation of wheel 80. Sensor S1 is accordingly most preferably of the Hall-effect type, being also connected with the control circuitry of oven tier or unit 20.

Also shown is another such motor M2. Its purpose is to drive another conveyor like 24 which, according to another version of the oven to be described, is spaced along and parallel to conveyor 24. Thus, in such a two-conveyor erbodiment of the oven, motor M2 is also connected with the control circuitry, as is also a Hall-effect sensor S2 for sensing the speed of rotation of motor M2. If only a single conveyor 24 is used, motor M2 is not needed and may not be present, but its presence in FIG. 2 demonstrates the manner of its connection with the control circuitry described hereinbelow.

Control Circuitry

Figure 4:
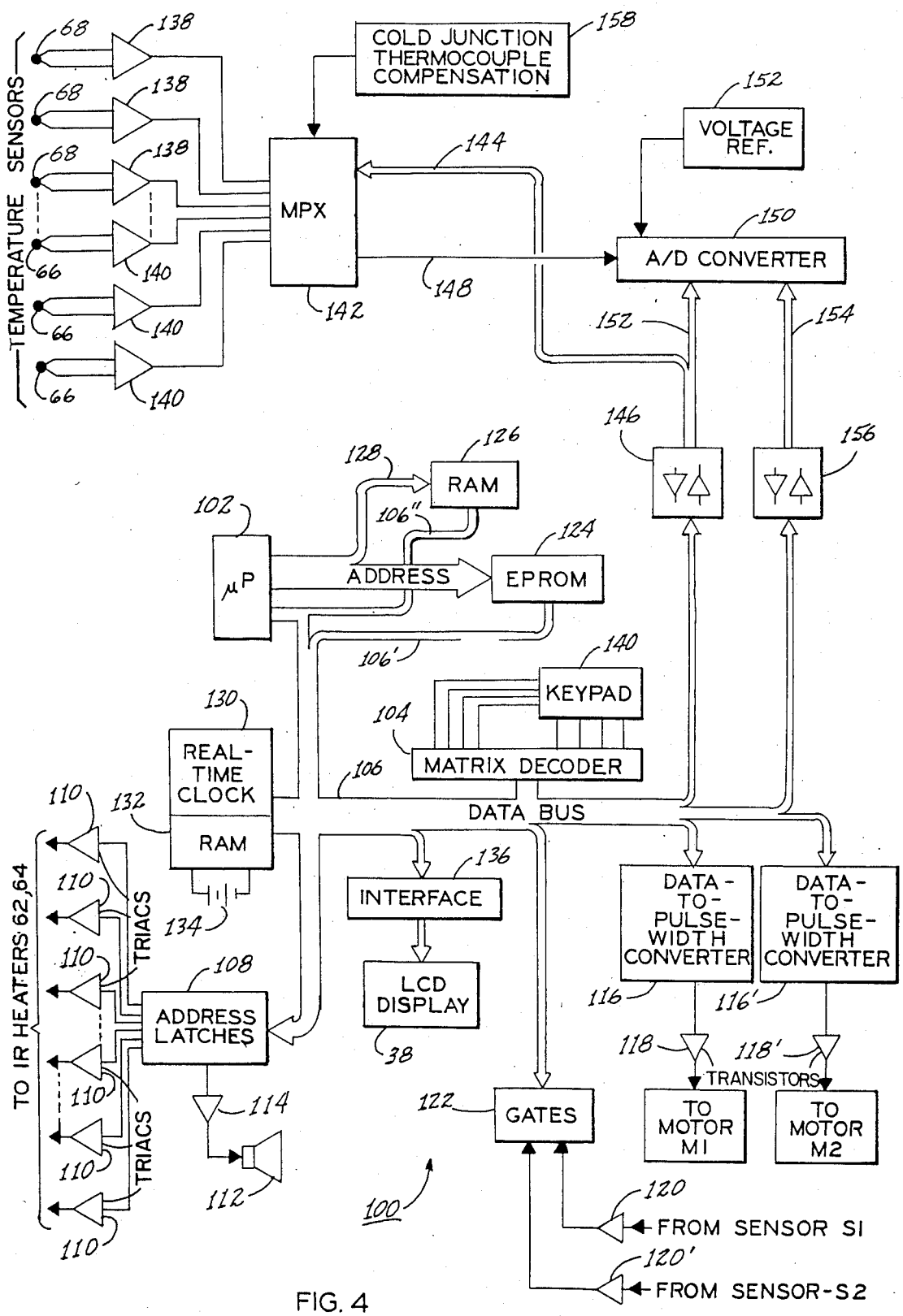
FIG. 4 is a schematic circuit diagram of control circuitry of the new tunnel oven.

Referring now to FIG. 4, control circuitry of the invention is designated in its entirety generally by reference numeral 100 Such circuitry includes a microprocessor 102 of conventional 8-bit configuration such as commercially available type 6802. Microprocessor 102 provides supervisory control and execution of all functions of the circuitry, including energization of the IR heaters or units 62, 64, monitoring of thermocouples 66, 68 and driving of motor M1 (and motor M2, if used) all as provided by user inputs from keypad 40. The latter is connected to a conventional matrix decoder 104 for providing conventional decoding of the keypad input and providing same as conventional BCD data to a data bus 106 which is interconnected with the microprocessor Briefly, data upon data bus 106 is provided to address latches 108 according to addressed provided upon data bus 106 by microprocessor 102. Such conventional latches 108 supply signals to electronic switching devices such as triacs 110 which control the switching of utility service AC power to the IR heaters or units 62, 64. The actual number of such drivers 110 is dependent upon the number of heaters 62, 64.

Also shown is a speaker or other transducer 112 (such as of piezoelectric type) for providing audible signals such as preferably tones or beeps when driven through a driver 114 such as a power transistor when appropriately addressed by data on bus 106. Thus, it is preferred to provide a beep each time a numeral or other input is entered by keypad 40. Transducer 112 can also be used for signalling the end of a cooking interval, a fault, or other condition to which the user should be alerted.

Data of bus 106 is also provided to a pair of data-to-pulsewidth converters 116, 116' which are of conventional commercially integrated circuit type configured suitably for converting the data on bus 106, as appropriately addressed for each of motors M1, M2, to provide a pulse-form signal having thereby a data-selected pulsewidth. The pulse-form signal is supplied via drivers 118, 118' such as power transistors, to motors M1 and M2. Thus, by varying the pulsewidth according to programmed operation of microprocessor 102, the motor speed can be precisely controlled, causing products to be conveyed through the tunnel within a predetermined time interval and, thus also, through each zone I, II and III in a correspondingly shorter predetermined time interval.

For determining the motor speed and providing feedback control through operation of microprocessor 102, sensors S1 and S2 provide signals through buffers 120, 120'' to appropriate logic gates 122 of integrated circuit configuration. Such speed data on data bus 106 is made available to microprocessor 102, which is programmed to vary the pulsewidth accordingly by the use of a resident program contained within an electrically programmable read only memory (EPROM) 124 which is addressed by microprocessor 102 and provides signals by way of a bus extension 106'. The programming techniques by which such program for EPROM 124 is developed will be well within the skill of those programmers familiar with the type 6802 microprocessor, although other types of microprocessors may be utilized in constructing the invention.

Also shown is a random access memory (RAM) 126 which is addressed by an address connection 128 by microprocessor for storing the data utilized during execution of the program such as, for example, sensed temperatures, sensed motor speed, and the like. Data so stored in RAM 126 is inavailable by a bus extension 106'' to microprocessor 102.

Shown at 130 is a real-time clock circuit preferrably in the form of an integrated circuit chip having an internal random access memory (RAM) 132 for retaining the clock and any other desired data, 5 for access to same via data bus 106 by operation of microprocessor 102. A back-up battery 134 is preferably used for maintaining power for clock chip 130 and its internal RAM 132 in the case of a power outage or disconnection. Clock 130, by operation of microprocessor 102 and keypad 40, is utilized for providing time-of-day and for permitting microprocessor initiated actions of all desired functions at time-of-day settings provided via keypad 40, as desired by the user. Thus, for example, the new oven can be turned on automatically under control of microprocessor 102 at a present time of day.

Display 38 is preferably of the liquid crystal type (LCD) and is driven by a conventional integrated circuit interface 136 from data bus 106.

The instruction set of EPROM 124 for microprocessor 102 includes display by LCD display 38 of oven status, as when on or off; for signifying heating up to a preselected temperature; values of the actual temperatures within each of zones I, II and III, for both the bottom and the top radiating surfaces; various times, temperatures and other parameters set in by use of keypad 40; as well as various warning functions, such as overtemperatures or undertemperatures conditions or failure of components such as heating elements, jamming of the motor, loss of stored data in memory, and so forth.

Temperature sensed by thermocouples 58, 66 is monitored by microprocessor 102. For this purpose, thermocouples 58, 66 interconnect with respective differential amplifiers of integrated circuit type, as designated at 138, 140. The differential amplifiers accordingly provide analog signal voltages to a conventional integrated circuit multiplexer 142 controlled by data input 144 from microprocessor 102 in the form of 12-line addresses delivered through conventional integrated circuit two-directional gates 146. Multiplexer 142 thus develops a series of analog signals proportional to the temperature sensed by each of thermocouples 58, 66 according to the address provided on input 144, and such signals are provided by a lead 148 to an analog-to-digital (A/D) converter 150. A voltage reference is provided by a regulated circuit 152 for operation of A/D converter 150. Addressing for the A/D converter 150 is supplied by an address input 152 from the two-directional gates 146. Binary coded decimal (BCD) is accordingly provided from A/D converter 150 by a four line control connection 154 through two-directional gates 156 of conventional integrated circuit character and thus made available to data bus 106 for storage and comparison by microprocessor 102 with data provided in RAM 126 and EPROM 124.

EPROM 124 preferably is provided with a look-up table or tables by conventional programming for establishing appropriate temperature heating and cooling curves which will have been found appropriate for preventing overshoot upon energization of the respective IR heaters 62, 64 if heating is required to increase zone temperatures to pre-selected values and for permitting similarly an appropriate cooling down upper zone temperatures exceeding pre-selected values.

For proper operation of the thermocouple sensing arrangement, multiplexer 142 is provided by a reference voltage from a cold junction thermocouple compensation circuit 158. Circuit 158 may most preferably comprise a solid state temperature controller such as type LM135 which is biased with a zener-regulated voltage. It is preferred that such temperature controller of circuit 158 be located near the point of connections of thermocouples 58, 66 in order to provide a temperature-compensated voltage reference to multiplexer 142 so that the signal provided on line 148 corresponding to the respective thermocouple address will be referenced to room temperature, such otherwise there could result in error in the temperature sensed by thermocouples 58, 66. In operation of circuit 158 the signal from circuit 158 then constitutes a room temperature which digitally may be added to the absolute temperature sensed by each of thermocouples 58, 66.

Preferably, microprocessor 102 is caused to carry out a sequence of first sampling the temperatures measured by thermocouples 58, 66, the microprocessor then measuring the difference in temperatures (dT) between the beginning and end of the sampling interval (dt). Microprocessor 102 is then utilized to calculate in effect the slope (dT/dt) thereby determined. The microprocessor then compares such slope with the data of the look-up tables of EPROM 124 for the purpose of turning on or off the respective IR heater 62, 64 depending upon such comparison. The sampling interval is most preferably about 3–4 seconds, but most broadly preferred to be within the range of 2–10 seconds. Programming of the microprocessor for these purposes will be within the skill of programmers familiar with type 6802. Thus, the microprocessor provides addressed heating signals to lathes 108 for proportioned heater energizing during the sampling interval.

Similarly, comparison is made by the microprocessor between the sensed rate of speed of motors M1 and M2 (as developed by sensors S1 and S2, respectively, and made available through gates 122 for monitoring of the pulselength) and a preselected motor speed. The motor speed is then if necessary increased or decreased by corresponding change in the data made available to converters 116, 166' which thereby control the pulsewidth of the pulse-form signals provided to the motors. Such motor speed is data-correlated to a given interval of time for a food product to traverse the entire length of the tunnel or any of zones I, II or III, as measured in minutes and seconds of cooking time. However, if desired, EPROM 124 may be programmed to provide for profiled changes in the speed of conveyor 24 to provide thereby programming of different speeds of the conveyor for different food products as they traverse to different zones.

Accordingly, circuit 100 thereby provides the functions of temperatures control in the several zones of the tunnel oven and coordinated control of the conveyor speed to provide conveying of products through the tunnel and its several zones within a preselected cooking time.

The invention makes possible a profiling of the cooking of any type of food product by the use of different temperatures in the different zones. Thus, referring to FIG. 2, in zones I, II and III different temperatures $T_1$, $T_2$ and $T_3$ are shown, all of which are above a cooking range extending between a lower value $T_a$ and higher value $T_b$ appropriate for a food product to be cooked. The food product may, for example, be frozen when introduced into the tunnel and at initial temperature $T_0$. In a conventional tunnel oven wherein a single temperature is maintained, a typically linear function $F_1$ may typify the actual temperature of the product as it travels through a tunnel in the course of a cooking time interval $t_f - t_0$ and requiring a substantially high temperature within the oven to achieve a final temperature $T_b$. However, by providing the profiled differences in temperatures as among the separate zones of the new oven, a cooking function $F_2$ results wherein the high temperature $T_1$ brings the food product up to the beginning temperature $T_a$ at a much earlier time $t_1$. Cooking then increases along curve $F_2$ throughout zone II until time $t_2$ at which point the food product enters zone III in which a greatly reduced temperature $T_3$ is maintained such as will permit finishing of the cooking of the food product wherein its temperature asymptotically approaches the finished cooking temperature $T_b$ as the oven emerges at time $t_f$. Accordingly, zone I may be thought of as a bring-up zone for initially increasing the temperature of the food product very quickly to permit cooking to be initiated within the cooking range much earlier (at time $t_1$) than would occur with a conventional oven. It is seen, therefore, that cooking of food products by the use of different temperature zones permits a vast reduction in the amount of time required for cooking of the food product. In the case of a conventional oven, it is seen that cooking is not even initiated until a time $t_3$ and such would require maintenance of the food product within a cooking tunnel for longer than when using the present oven. In addition, it is apparent that a linear extrapolation $F'_1$ results if the food product is maintained within the tunnel oven for a time greater than $t_f$. Accordingly, a conventional oven may require the use of an even lower temperature than assumed for curve $F_1$ if an over-temperature exposure of the food product is to be avoided, thus even further lengthening cooking interval. If, in order to prevent such overshoot or excessive temperature, a much lower conventional cooking temperature were used, the food product may not cook at all. In cooking of some products, for example, gelatinization must occur such as between 160° and 180° F. Attempted cooking at less than 140° F. will not produce such gelatinization so that the product is not at all cooked, even when so heated for hours. The new oven entirely avoids such difficulties, allowing a cooking profile unique to each type of food product to be established and used during cooking. In net effect, food products are rapidly, accurately and uniformally cooked by the new oven by being differentially heated in the different zones, producing a novel and extremely advantageous profiled cooking of rhe food products as they are conveyed through the different zones in a precisely time-controlled manner.

In the above description, it has been assumed for simplicity's sake that only a single temperature is associated with each of zones I, II and III. The new oven, however, makes possible the provision of different upper and lower temperatures within each such zone. Thus, for example, in zone II or III, a much higher roof temperature can be maintained for browning of a product such as a pie or other surface heating coloration or effect desired.

In addition to the profiled temperature-versus-time relationships thus obtained by the new oven, its microprocessor circuitry permits still other extraordinary advantages to be attained. For example, the oven can be programmed to turn on automatically at a given time of day and to maintain only a stand-by temperature, which will conserve electricity, until user initiation of cooking is entered by keypad 40. Then, temperature control automatically brings the temperatures in each zone to preselected values, as established by the user in advance by keypad entry. Also, the oven can be programmed to turn off or to return to its stand-by mode at a given time. Additionally, the oven is readily programmed for causing microprocessor 102 to sequentially, if desired, turn on oven heater units to avoid exceeding a predetermined peak current demand which, if exceeded, would cause the user to incur excess electric power charges In addition to the normal cooking provided, an oven of the present configuration also can be caused to enter a self-cleaning mode wherein the internal temperatures are sufficiently great, e.g., up to nearly 1000° F., that food particles will be carbonized. Normally, however, temperatures for cooking within the different zones may be broadly within the range of 200°–900° F.

During usage, the user may by use of keypad 40 interrogate the circuitry to ascertain the temperatures at the top and bottom of any of the zones and monitor all aspects of the operations. Self-diagnostic capability is also inherent within the circuitry since microprocessor 102 can be programmed to monitor various conditions, such as motor overspeed, underspeed, stall, overtemperature conditions, or the like, to which the user should be alerted.

Figures 6, 7:
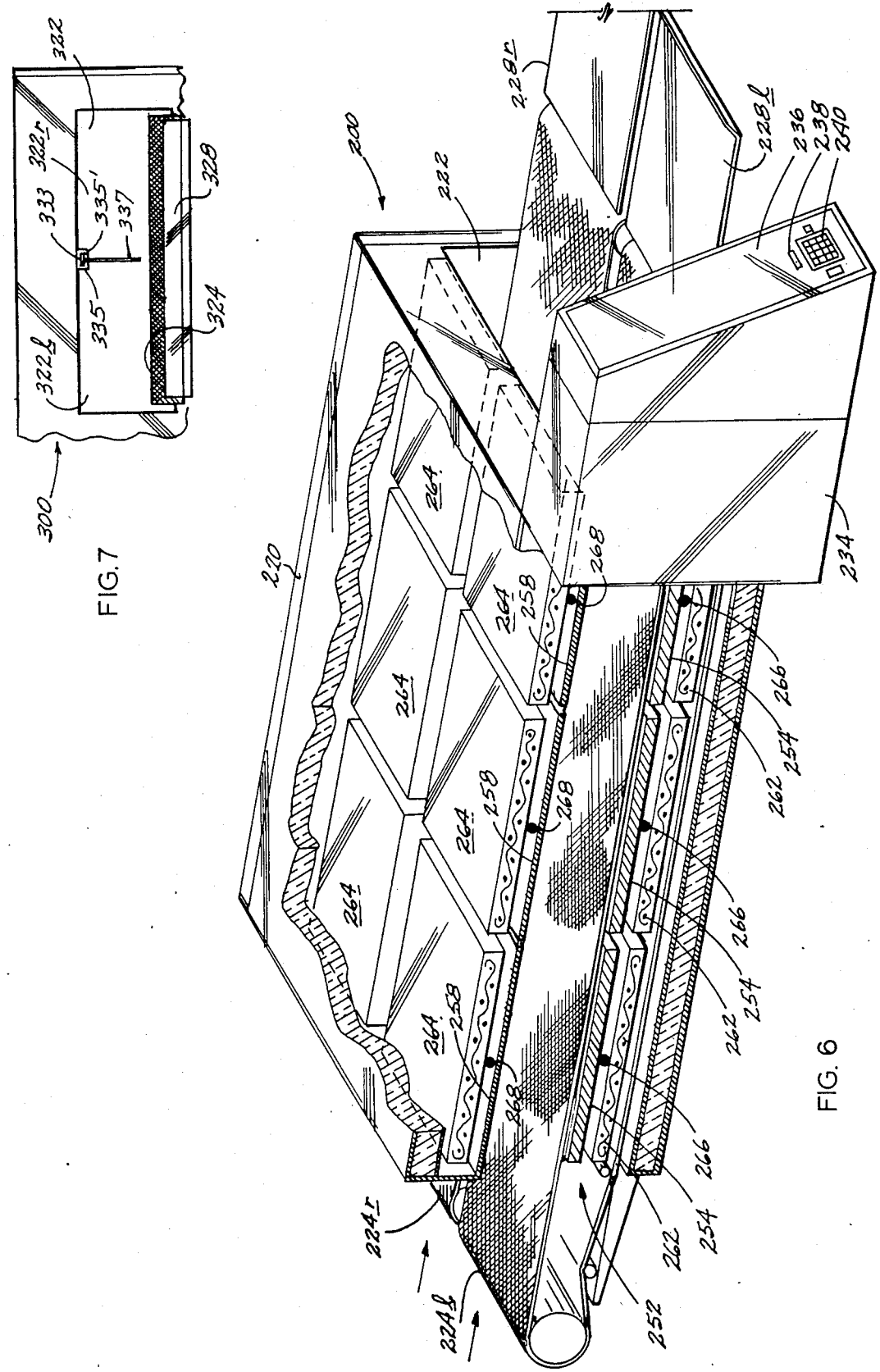
FIG. 6 is a partially sectioned, simplified illustration of a modified version of a tier of the new oven.
FIG. 7 is a fragmentary end view of a further modification of the oven tier of FIG. 6.

Referring to FIG. 6, a modified tier 200 of the new oven includes a center portion 220 having a widened tunnel-form cooking chamber 222 through which extend two conveyors 224l, 224r which are independently driven by motors M1, M2 (see FIG. 2) in side-by-side relation. Delivery or serving shelves 228l, 228r are associated with the two conveyors. A control extension 234 contains control circuitry and presents a sloping panel 236 on which are provided a display 238 and keypad 240 of the previously described character for display and entry respectively, of data such as temperatures and cooking times for both the left and right halves of tunnel 222. A motor and conveyor drive housing extension may be provided but, for simplicity, is not shown.

Extending longitudinally as a hearth 252 below conveyor 224l are separate hearth plates 254 below which are respective IR heater units 262 and thermocouple sensor probes 266. Similar separate hearth plates and IR heating units, etc. (not shown), extended beneath conveyor 224r. Above conveyor 24l is a roof 250 having separate roof plates 258 over which are respective IR heater units 264, as well as thermocouple probes 268 for direct temperature sensing as above described. Accordingly, there will be seen to be provided within tunnel 222 a total of six zones in left and right pairs according to three longitudinal zone separations along the length of the tunnel, with each of such zones having its own separate upper and lower IR heating units as well as separate hearth plates or roof panels whereby there is provided both longitudinal and lateral zoning within the oven. Of course, as before, each such zone may be further vertically divided into upper and lower portions.

Oven tier 200 may be used in a multiple-tier oven according to the previously described general configuration to provide a stacking of tiers which are each independent. However, more importantly, each such tier 200 is, in effect, two side-by-side tunnel halves albeit forming one tunnel. In each half of the tunnel, cooking time for food products may be different by reason of the conveyors 224l, 224r travelling at different speeds. Upper and lower cooking temperatures (IR emission) within each of three longitudinal zones of each half of the tunnel may be separately maintained.

Microprocessor circuitry of FIG. 4 is preferably utilized and its capabilities are such that a single keypad 240 and display 238 are adequate for user selection and monitoring of the various temperatures, cooking times and other parameters associated with each of the left and right tunnel halves.

Alternatively, control panel 236 may be provided with separate keypads and displays for the two halves of the oven.

Referring to FIG. 7, a modified tier 300 is shown. It includes a widened tunnel 322 like tunnel 222 and having a left portion 322l and right portion 322r. A single conveyor 324 extends longitudinally through tunnel 322 for delivery of food products to a delivery shelf or station 328, being delivered accordingly by a single motor of the type disclosed above. The tunnel halves 322l and 322r may each have separate hearth plates and hearth heaters of the IR type as above disclosed, as well as separate roof panels and separate IR heating units for such roof panels to provide multiple longitudinal zoning within each of the two halves. Food products thereby travel through each of the two tunnel halves with the same cooking time. However, different temperatures can be maintained laterally within each of the longitudinal zones of tunnel 322.

For increased thermal isolation laterally as between the two tunnel halves, a barrier 331 is shown extending from the roof of tunnel 322 to a point near the upper surface of conveyor 324. Barrier 331 extends the full length of the tunnel 322 and may be of metal or other temperature-resistant material such as will enhance the maintaining of separate temperatures on opposite sides of such barrier 331. Barrier 331 may be secured by suitable means such as by having an enlarged portion or rail 333 at its upper edge fitted between L-shaped brackets 335, 335′ carried along the length of the tunnel roof. The barrier may accordingly be readily removed, if not needed or to permit food products of wide extent to be conveyed.

Operation of the new oven is seen to provide an advantageous method of tunnel oven cooking of food products. The method thus includes heating interior surfaces within the tunnel to provide at least two different zones extending longitudinally along the tunnel, and maintaining different hearth and roof emission temperatures within the different zones according to a desired heating profile for the products. Thus, when conveyed through the different zones in a time-controlled manner, profiled cooking of the food products is obtained. Most preferably, the roof and hearth temperatures in the first zone are maintained sufficiently great for bringing up the food products to cooking temperature, while the roof and hearth temperatures in the second zone are maintained at temperatures less than in the first zone but sufficiently great for actual cooking of the food products.

Of course, as illustrated, a third different zone can also be provided wherein still lower hearth and roof temperatures are maintained but sufficiently great for finishing the food products.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A method of infrared cooking of food products in a tunnel oven comprising heating interior surfaces within a tunnel to provide a plurality of different heating zones extending longitudinally along the tunnel in end-to-end relationship, maintaining different infrared emission temperatures of such interior surfaces within the different zones according to a desired heating profile, such that at least two different such zones are provided wherein the temperature in a first of such zones is maintained substantially higher than the temperature in a second of such zones, the temperature in the first zone being automatically maintained sufficiently great for bringing up the food products to a cooking temperature; the temperature in the second zone being automatically maintained at a lesser value sufficiently great for cooking of the food products, said heating being carried out by heating roof and hearth surfaces within each such zone for infrared emission from such roof and hearth surfaces, including separately monitoring and controlling the temperatures of the roof and hearth surfaces in each such zone and conveying food products through the tunnel successively, through the different zones in a time-controlled manner comprising preselecting a cooking time for the food products for being conveyed along the tunnel length, and automatically controlling the speed of conveying the food products to cause them to be conveyed along the tunnel length in the preselected cooking time, thereby to provide profiled cooking of the foor products.

2. A method of infrared tunnel oven cooking according to claim 1, the heating providing also a third different zone, the temperature in the third zone being automaticlly maintained at a still lesser temperature sufficiently great for finishing of the food products.

3. A method of infrared tunnel oven cooking according to claim 1, wherein the steps of automatically maintaining different infrared emission temperatures within said zones and automatically controlling the speed of conveying the food products are microprocessor implemented.

* * * * *